(12) United States Patent
Corbett, Jr.

(10) Patent No.: US 6,328,309 B1
(45) Date of Patent: Dec. 11, 2001

(54) PIPE BELLING PROCESS USING ANTI-FRICTION COATING

(76) Inventor: Bradford G. Corbett, Jr., 1300 E. Berry, Fort Worth, TX (US) 76119

( * ) Notice: Subject to any disclaimer, the term of this patent is extended or adjusted under 35 U.S.C. 154(b) by 0 days.

(21) Appl. No.: 09/449,049

(22) Filed: Nov. 24, 1999

(51) Int. Cl.[7] .................................................. B29C 45/14
(52) U.S. Cl. ........................ 277/314; 277/627; 277/652; 425/393; 425/DIG. 218; 264/516; 264/275
(58) Field of Search ..................................... 277/314, 316, 277/626, 652, 627; 425/384, 218, 393, DIG. 218; 264/516, 275, 279

(56) References Cited

U.S. PATENT DOCUMENTS

| | | | |
|---|---|---|---|
| 3,423,315 | 1/1969 | McCarthy | 252/19 |
| 3,852,016 | * 12/1974 | Delauzun | 425/393 |
| 4,030,872 | * 6/1977 | Parmann | 425/393 |
| 4,061,459 | * 12/1977 | Parmann | 425/403 |
| 4,120,521 | * 10/1978 | Parmann | 285/113 |
| 4,410,185 | * 10/1983 | Sporre . | |
| 4,690,414 | 9/1987 | Haaland | 277/207 |
| 4,951,954 | * 8/1990 | MacNeill . | |
| 5,128,209 | * 7/1992 | Sakai et al. | 428/421 |
| 5,143,381 | * 9/1992 | Temple . | |
| 5,431,831 | 7/1995 | Vincent | 252/29 |
| 5,599,028 | 2/1997 | Neumann | 277/199 |
| 5,928,451 | * 7/1999 | Johansson et al. | 156/242 |
| 6,033,617 | * 3/2000 | Guzowski | 264/516 |
| 6,152,494 | * 11/2000 | Corbett, Sr. et al. | 285/110 |

* cited by examiner

*Primary Examiner*—Anthony Knight
*Assistant Examiner*—Alison K. Pickard
(74) *Attorney, Agent, or Firm*—Bracewell & Patterson, LLP

(57) ABSTRACT

An improved pipe belling process is shown which a gasket is installed on the outer working surface of a forming mandrel at one circumferential location. The heated socket end of a thermoplastic pipe is forced over the mandrel exterior and over the gasket causing the heated socket end of the pipe to flow over the gasket and form a retention groove for retaining the gasket before again contacting the working surface of the mandrel. The heated end of the pipe is cooled and retracted from the working surface of the mandrel. The gasket has a non-stick, anti-friction coating applied to portions of the exterior thereof.

12 Claims, 4 Drawing Sheets

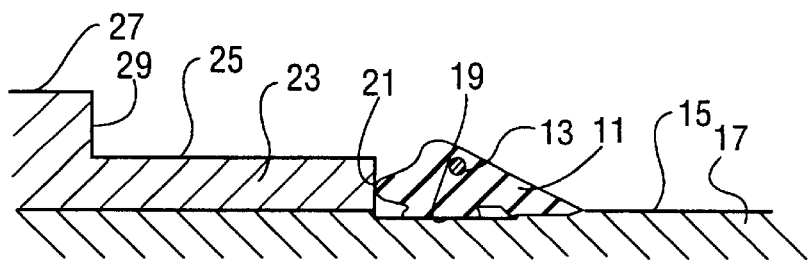
(PRIOR ART)    *FIG. 3*
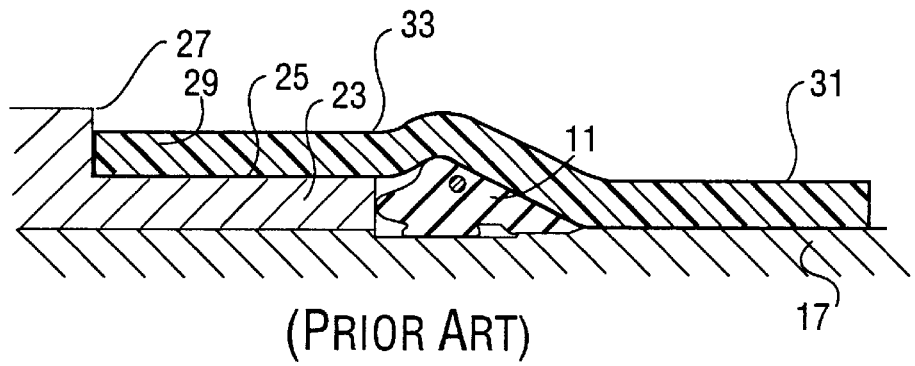
(PRIOR ART)    *FIG. 4*
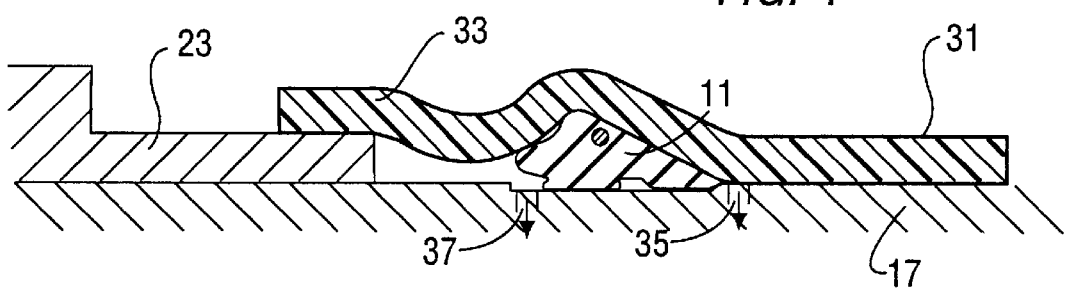
(PRIOR ART)    *FIG. 5*
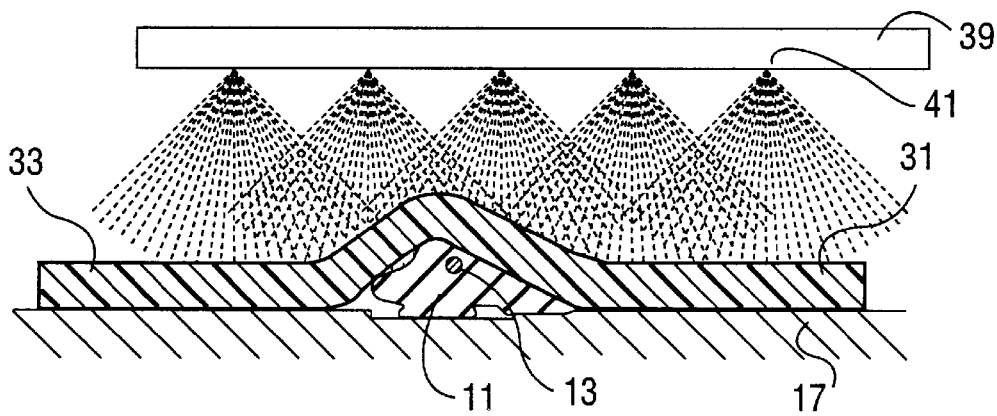
(PRIOR ART)    *FIG. 6*

US 6,328,309 B1

PIPE BELLING PROCESS USING ANTI-FRICTION COATING

BACKGROUND OF THE INVENTION

1. Field of the Invention

The present invention relates generally to sealing systems for thermoplastic pipes and, specifically, to an improved belling process for installing a gasket in a socket end of a thermoplastic pipe.

2. Description of the Prior Art

Pipes formed from thermoplastic materials including polyethylene and PVC are used in a variety of industries. In forming a joint between sections of pipe, the spigot or male pipe end is inserted within the female or socket pipe end. An annular, elastomeric ring or gasket is typically seated within a groove formed in the socket end of the thermoplastic pipe. As the spigot is inserted within the socket, the gasket provides the major seal capacity for the joint. It is critical, during the installation process, that the gasket not be able to twist or flip since a displaced or dislocated gasket will adversely affect the ultimate sealing capacity of the joint.

One early attempt to ensure the integrity of such pipe joints was to provide local reinforcement of the groove portion of the socket end by means of a heavier wall thickness in this region of the pipe. In some cases, reinforcing sleeves were also utilized. Each of these solutions was less than ideal, in some cases failing to provide the needed joint integrity and often contributing to the complexity and expense of the manufacturing or field assembly operations.

In the early 1970's, a new technology was developed by Rieber & Son of Bergen, Norway, referred to in the industry as the "Rieber Joint." The Rieber system employed a combined mould element and sealing ring for sealing a joint between the socket end and spigot end of two cooperating pipes formed from thermoplastic materials. In the Rieber process, the elastomeric gasket was inserted within an internal groove in the socket end of the female pipe as the female or belling end was simultaneously being formed. The provision of a prestressed and anchored elastomeric gasket during the belling process at the pipe factory provided an improved socket end for a pipe joint with a sealing gasket which would not twist or flip or otherwise allow impurities to enter the sealing zones of the joint. These features increased the reliability of the joint and decreased the risk of leaks or possible failure due to abrasion or other factors. The Rieber process is described in the following issued U.S. Pat. Nos.: 4,120,521; 4,061,459; 4,030,872; 3,965,715; 3,929,958; 3,887,992; 3,884,612; and 3,776,682.

Despite the advances offered by the Rieber process, certain problems could occur both in the manufacture of the joint and integral gasket and in certain field applications. In the manufacturing plant, frictional resistance between the gasket and mandrel or pipe could hamper the forming operation. In some field operations, particularly involving larger diameter pipe, the insertion force needed to install the male spigot end within the mating socket end could, on some occasions, cause the gasket to be distorted or displaced.

One attempted solution, both in the manufacturing plant and in the field, was to utilize a lubricant to reduce frictional forces. The lubricant could be applied during formation of the pipe joint and at the point of assembly of the pipe joint in the field, as by brushing, spraying or dipping the gasket in a suitable liquid or viscous lubricant compound. This approach was messy and inconsistent and often proved to be unsatisfactory. The lubricating effect was not permanent or even semi-permanent.

Accordingly, it is an object of the present invention to provide an improved pipe belling process of the type described which is more efficient and which produces more consistent results without the use of a liquid lubricant.

It is also an object of the present invention to provide a pipe gasket with a novel spray-on anti-friction coating on selected surfaces thereof which facilities the manufacturing operation and which also provides a lower insertion force for the male, spigot end when entering the female, spigot end to facilitate assembly of the pipe joint in the field.

SUMMARY OF THE INVENTION

A method is shown for installing a gasket in a socket end of a thermoplastic pipe which is used to form a pipe coupling. A mandrel is provided with an inner end and an outer end and having a generally cylindrical outer working surface. A gasket is installed at a first circumferential position on the outer working surface. The gasket has at least selected surfaces coated with a spray-on anti-friction coating. A retention member is provided at a second circumferential location on the mandrel nearer the inner end of the mandrel with the retention member abutting the gasket in a normally extended position. A socket end of a thermoplastic pipe is then heated and forced over the working surface of the mandrel and over the gasket, whereby the heated socket end of the thermoplastic pipe flows over the gasket to form a retention groove for retaining the gasket and again contacts the working surface of the mandrel. The heated socket end of the thermoplastic pipe is then cooled and retracted from the mandrel leaving the gasket within the retention groove of the pipe end.

Preferably, the spray-on anti-friction coating is applied by spraying on a dry powder followed by heating the powder to cause it to be fixed. The preferred dry powder is a fluoropolymer powder, most preferably polytetrafluoroethylene.

In the preferred embodiment, the gasket is an elastomeric, ring shaped member having a circumferential contact area and an exterior surface, the anti-friction coating being applied to at least selected portions of the circumferential contact area.

Additional objects, features and advantages will be apparent in the written description which follows.

DESCRIPTION OF THE DRAWINGS

FIGS. 3–6 are simplified, schematic illustrations of the prior art Rieber process for installing a compression, seal gasket within a groove formed within the female socket end of a thermoplastic pipe;

DETAILED DESCRIPTION OF THE INVENTION

Figure 1:
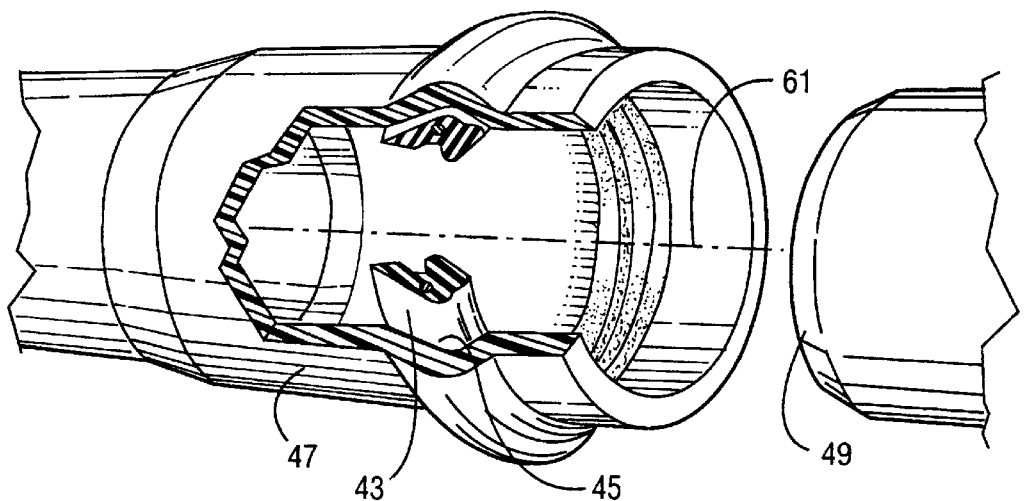
FIG. 1 is a partial, perspective view, partly broken away showing a pipe joint manufactured according to the method of the invention, the male spigot pipe end being inserted within a female socket end to form the pipe joint.

FIG. 1 shows a sealing g gasket of the invention, designated generally as 43 which is installed within a groove 45 provided within a socket end 47 of a thermoplastic pipe. The gasket 43 has the improved non-stick anti-friction coating 10

(FIG. 2) so that insertion of the male, spigot pipe section 49 within the female, socket section 47 can be achieved with a minimum insertion force while maintaining the desired compression seal for the joint so made up.

Figure 2:
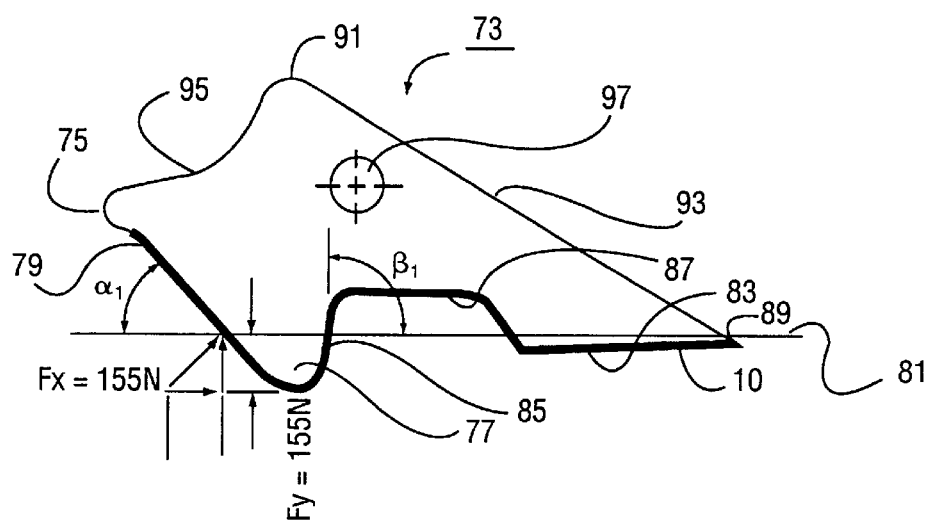
FIG. 2 is a side, cross-sectional view of a gasket used in the method of the invention, the gasket having a non-stick, anti-friction coating applied to a contact surface thereof.

Turning to FIG. 2, there is shown a pipe sealing gasket of the invention designated generally as 73. The gasket 73, includes a nose region 75 which is joined to a lower compression region 77 by a leading Curved surface region 79 which defines an angle $\alpha_1$ with respect to the horizontal axis 8 drawn parallel to a central axis 61 of the pipe. The lower compression region 77 is joined to a secondary seal surface 83 by a trailing curved surface region 85 and an intermediate circumferential groove region 87. The trailing curved Surface region, 85 defines a second angle $\beta_1$ with respect to the horizontal axis 81 drawn parallel to the central axis 61 of the pipe.

The secondary seal surface 83 is a planar circumferential region which terminates in an inside corner 89 of the gasket 73. The inside corner is connected to an outer arcuate region 91 of the Gasket 73 by a uniformly sloping exterior gasket surface 93. The outer arcuate region 91 is connected to the nose region 75 of the gasket by a concave curved region 95. The gasket 93 may also be provided with a reinforcing element such as the metal ring 97.

In the case of the improved sealing gasket 73 of the invention, the angles $\alpha_1$ and $\beta_1$ are selected to minimize the insertion force required when inserting a male spigot end 49 within the female socket end 47 while maintaining a compression seal between the pipe sections. Preferably, the angle $\alpha_1$ is selected to be less than or equal to about 60° while the angle $\beta_1$ is selected to be greater than or equal to about 45° with respect to the horizontal axis 81 drawn parallel to the central axis 61 of the pipe. Most preferably, the angle al is selected to be about 45° or less while the angle $\beta_1$ is selected to be approximately 90°.

In the example of FIG. 2, where the angle $\alpha_1$ is approximately 45° and the angle $\beta_1$ is approximately 90°, the insertion force components are resolved into x and y component vectors which, in this case, produce an x component of 155 Newton and a y component of 155 Newton.

The gasket 73 is thus an elastomeric, ring shaped member having a circumferential contact area, e.g., the leading curved surface region 79, the lower compression region 77 and the secondary seal surface 83. The gasket also has an exterior surface which includes the regions 93 and 95 which generally contact the interior of the thermoplastic pipe during the forming operation. In the method of the invention, selected surfaces of the gasket are coated with an anti-friction coating 10. Generally, at least the leading curved surface region 79 is coated with the anti-friction coating 10. Preferably, the regions 79, 77 and 83 all have the coating applied thereto.

The anti-friction coating 10 which is applied to the selected surfaces of the gasket is a synthetic polymeric coating. The selected synthetic polymer is preferably thermoplastic and can be selected from such materials as polyvinyl chloride, fluoroplastic polymers, nylon, and the like, depending upon the end application of the pipe joint. The preferred coatings are fluoroplastic polymers. Fluoroplastics are a class of paraffinic polymers that have some or all of the hydrogen replaced by fluorine. They include polytetrafluoroethylene, fluorinated ethylene propylene copolymer, perfluoroalkoxy resin, polychlorotrifluoroethylene copolymer, ethylene-tetra-fluoroethylene copolymer, polyvinylidene fluoride and polyvinyl fluoride. Fluoroplastics have a low coefficient of friction, especially the perfluorinated resins, giving them unique nonadhesive and self lubricating surface qualities.

Polytetrafluoroethylene (PTFE) is a completely fluorinated polymer manufactured by free radical polymerization of tetrafluoroethylene. With a linear molecular structure of repeating —$CF_2$—$CF_3$-units, PTFE is a crystalline polymer with a melting point of 327 degrees C. Density is 2.13 to 2.19 g/cc. PTFE's coefficient of friction is lower than almost any other known material. It is available in granular, fine powder (e.g., 0.2 micron), and water based dispersion forms. In the United States, PTFE is sold as "TEFLON" by Du Pont de Nemours Co.

The non-stick, anti-friction coating 10 used in the method of the invention is preferably applied by spraying on as a dry powder, followed by heating to fix or cure the coating 10. The techniques used can vary from conventional air atomized spray coating using a spray gun to such techniques as electrostatic deposition.

For electrostatic deposition, individual particles of polymer powder are statically charged and applied to the gasket surfaces, preferably at ambient temperatures. Even non-conductive surfaces such as the gasket surfaces can be coated using a variety of manual and automatic electrostatic application equipment including electrostatic air atomized, airless, air-assisted airless and rotary atomized powder particles arc negatively charged by either direct contact charging or by high voltage ranges from 60,000 to 120,000 volts with very low electrical currents (100 to 200 microamperes). The negatively charged particles seek a positively grounded object to satisfy the negative charge potential. The electrostatic force is so great that powder particles traditionally lost by overspray and bounceback from conventional air-atomized spray are attracted to the grounded part.

For electrostatics to be employed with rubber substrates, the rubber must be made conductive or appear conductive to the negatively charged particles. Methods which can be used to achieve this end include electrostatic prep coats on the rubber substrate, conductive primers, use of a grounded metal work holder beneath the part, using a rubber compound which has itself been made conductive or precharging the part.

The dry powders can also have a color additive, such as a suitable pigment, dispersed therein which impart a distinctive color to the coated region of the gasket. Color markings of this type can be used for product identification purposes, e.g., for use as a water pipe joint, a sewer pipe joint, etc.

After application of the dry powder to the substrate, the coated gasket is heated, either reflectively or in an oven, to fix or set the coating. The exact temperature employed will depend upon the particular fluoropolymer chosen and the manufacturer's recommendation.

The advantages of the method of the invention can best be understood with reference to a simplified discussion of the prior art Rieber process. Turning first to FIGS. 3–6, the prior al process is illustrated. FIG. 3 shows a section of a conventional elastomeric sealing gasket 11 having a steel reinforcing ring 13 in place on the generally cylindrical outer working surface 15 of the mandrel 17 used in the belling process. The elastomeric gasket 11 can be formed of, for example, rubber and is a ring shaped, circumferential member having an inner compression surface 19 and an exposed nose portion 21 which, as shown in FIG. 3, abuts a forming collar 23. The forming collar 23 has a first generally cylindrical extent 25 which is joined to a second cylindrical extent 27 by a step region 29, whereby the second extent 27 is of greater external diameter than the first cylindrical extent 25, shown in FIG. 3.

In the first step of the prior art process, the steel reinforced elastomeric ring 11 is thus placed onto the working surface of the mandrel 17 and pushed to a position against the back-up or forming collar 23. In this position, the gasket is firmly anchored to the mandrel surface with the rubber between the mandrel and the steel-ring of the gasket being compressed by approximately 20%.

In the second step of the prior art process, the socket end 33 of the thermoplastic pipe 31 is heated and pushed over the steel mandrel 17, gasket 11 and back-up collar 23. The socket end 33 is expanded due to the thermoplastic nature of the pipe. A number of thermoplastic materials, such as polyethylene, polypropylene and polyvinylchloride (PVC) are known in the prior art having the required expansion characteristics, depending upon the end application of the pipe joint. The socket end 33 flows over the first cylindrical extent 25 of the back-up collar 23 and abuts the step region 29 in the second step of the process.

In the next step of the prior art process (FIG. 5) the mandrel and pipe move away from the back-up collar 23 and the pipe socket end 33 retracts around the mandrel and gasket 11 due to the elastic forces of the thermoplastic material. Typically, vacuum was also applied through ports 35, 37 which connected the mandrel working surface with a vacuum source (not shown).

In the final step of the prior art process, the pipe socket end 33 is cooled by means of a water spray bar 39 and spray nozzles 41. As the cooling takes place, the pipe socket end 33 shrinks around the gasket 11, thus compressing the rubber body of the gasket between the steel reinforcing ring 13 and the socket-groove to establish a firm seal.

The above described Rieber process has been in commercial use since the early 1970's and is described in the above referenced issued United States patents, among other sources. It will thus be well familiar to those skilled in the thermoplastic pipe sealing arts.

FIGS. 7–12 illustrate another manufacturing set up which utilizes an improved mandrel 43. The mandrel is a generally cylindrical member having an outer working surface 51. As will be explained more fully, a gasket 57 is installed at a first circumferential position (FIG. 7) which forms a slight recess on the outer working surface 51 of the mandrel 43.

Figure 7:
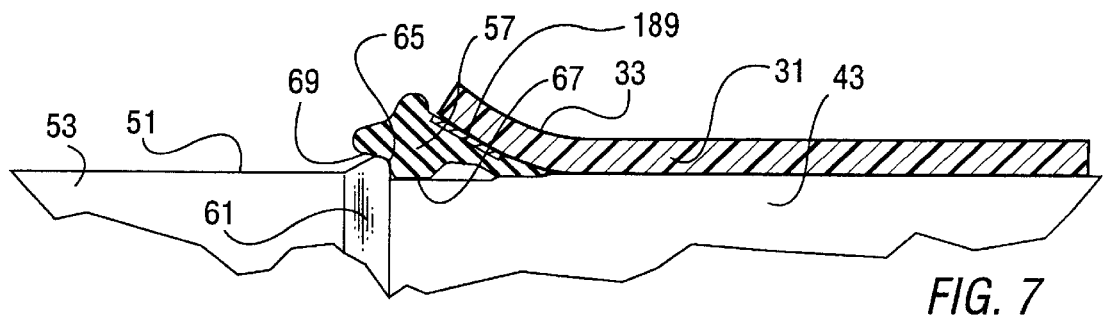
FIGS. 7–12 are views similar to FIGS. 3–6 but showing the use of spring loaded detents as the gasket retaining member on the forming mandrel.

A plurality of spring loaded detents 61 are located at a second circumferential location which is nearer the inner end 53 of the mandrel 51. As shown in FIG. 7, the spring loaded detents 61 have exposed lip portions 65 which, as shown in FIGS. 7–10 abut the gasket 57 in a normally extended position. As described with respect to the prior art process, the gasket 57 (FIG. 7) again has a circumferential compression surface and a circumferential nose region 69 which protrudes generally in the direction of the inner end 53 of the mandrel in the relaxed state.

Generally two or more detents and associated spring loading mechanisms will be located about the circumference of the first circumferential location on the mandrel. In the preferred embodiment of the invention, four spring loaded detents are located at equally spaced positions about the periphery of the mandrel at the first circumferential location. The spring loaded detents are also retractable to a retracted position (FIG. 11) with the lip portions 65 flush with the outer working surface 51 of the mandrel 43.

In the first step of the method using the mandrel 53, a gasket 57 is installed on the outer working surface 51 of the improved mandrel 43, according to the prior art placement techniques. The gasket 57 is installed at a first circumferential location on the outer working surface 51 of the mandrel 43 so that the concave region which joins the nose region 69 to the compression surface 67 abuts the lip portion 65 of the spring loaded detent 61.

After the gasket 57 is installed on the working surface 51 of the mandrel 43 in the position shown in FIG. 7, the socket end 33 of the thermoplastic pipe 31 is heated in conventional manner and forced over the exterior surface of the gasket 57. In this case, the gasket 57 has an external steel band 189 which serves to pre-compress the gasket against the mandrel exterior and assist in retaining the gasket in the desired position. Additionally, the gasket 57 is retained in position by the exposed lip portions 65 of the spring loaded detent 61. Other gasket designs will be familiar to those skilled in the art and include reinforcing lings and bands of various shapes either exposed on the gasket exterior or embedded within the gasket material.

Figure 8:
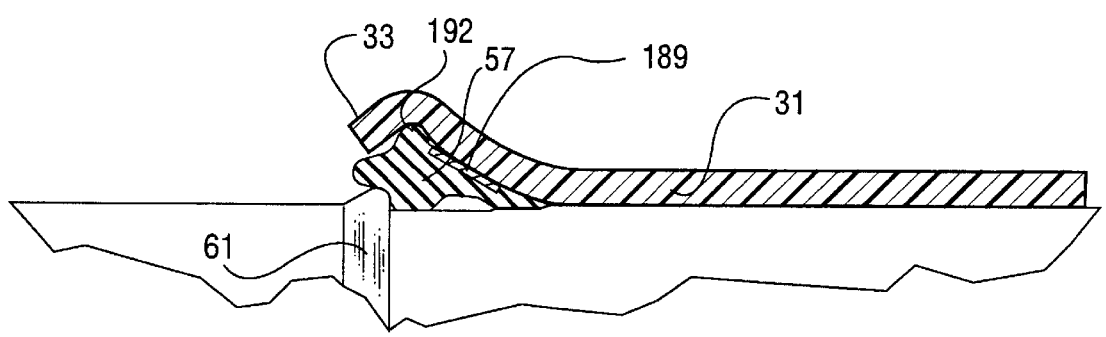
Figure 9:
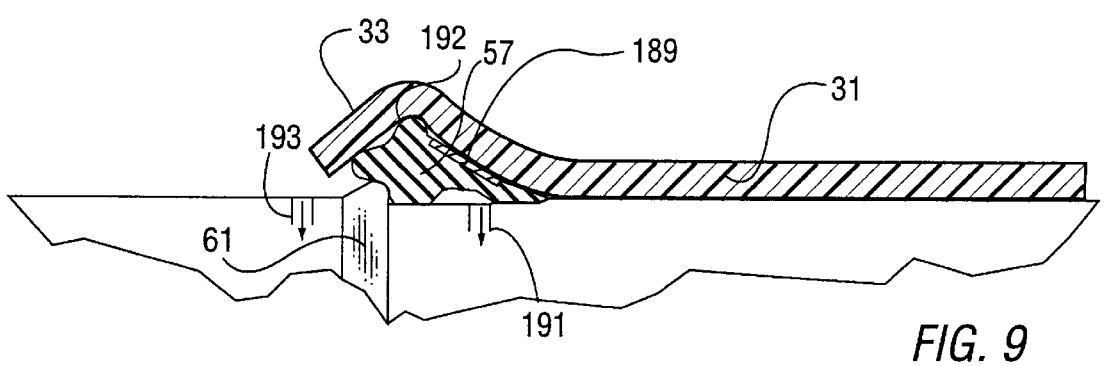
Figure 10:
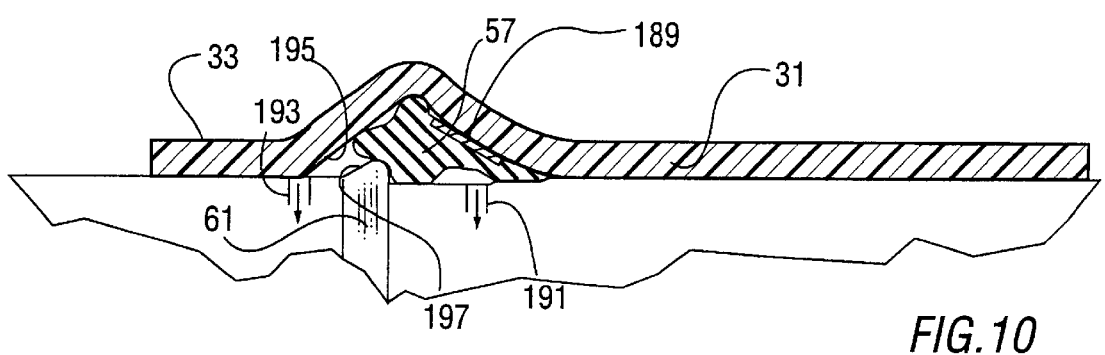

In the next step of the method, shown in FIG. 8, the heated pipe end 33 begins to flow over the rear exterior surface 192 of the gasket 57. As the pipe socket end 33 continues to flow over the gasket, it is gradually retracted about the mandrel exterior (FIGS. 9–10). As the heated pipe end flows over the gasket 57, the action of retracting the gasket can be facilitated by applying a vacuum through the mandrel ports 191, 193. With the gasket in the position shown in FIG. 11, the heated socket end would typically be cooled, as by spraying with a water bath as described with respect to FIG. 6 of the prior art.

Figure 11:
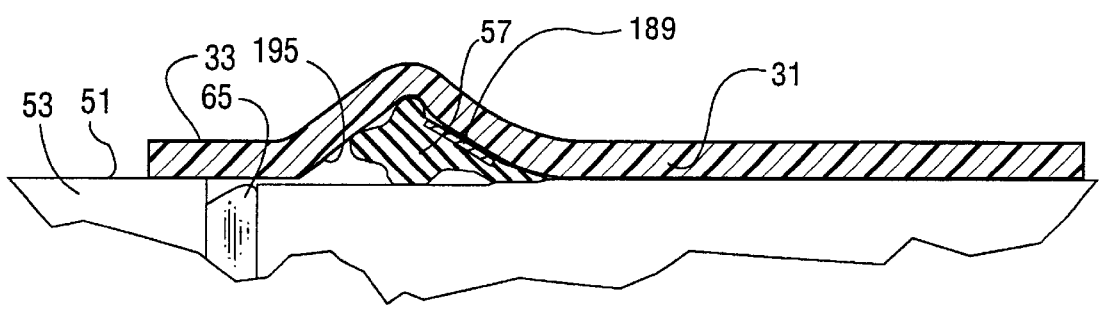
Figure 12:
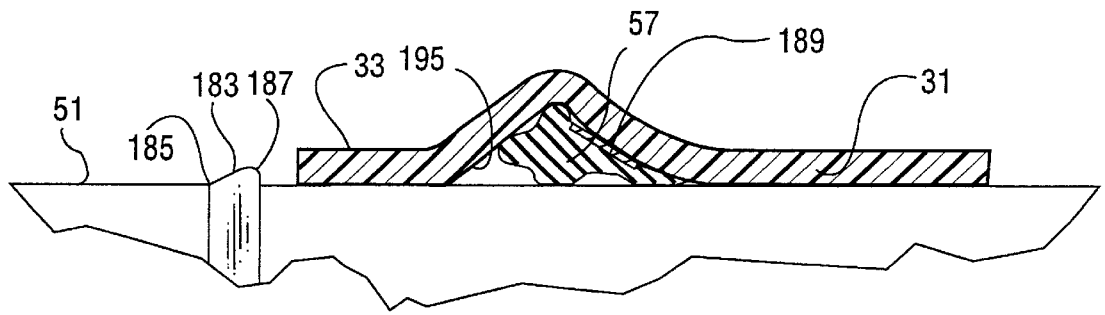

FIGS. 11–12 show the final steps in the manufacturing process in which the pipe 31 and gasket 57 are withdrawn from the mandrel working surface 51. As the socket end 33 is retracted, the internal groove surface 195 (FIG. 10) contacts the sloped region 197 of the exposed detent lip, thereby forcing the spring loaded detent to the retracted position shown in FIG. 11. As the pipe end is removed from the mandrel 43, the spring loaded detents return to the exposed position shown in FIG. 12.

The anti-friction coating 10 which is applied to the selected gasket surfaces facilitates the above described manufacturing processes as well as subsequent make up of the pipe joint in the field. The coating 10 reduces scrap rate in the manufacturing plant since gaskets can be more easily and accurately installed on the forming mandrel with reduced frictional forces. The sprayed on coating 10 reduces the mess associated with liquid lubricants which were often applied to the inside, outside or both surfaces of the gasket. Certain of the water based lubricants used in the past required relubricating during the process which was messy and inefficient. Another advantage is that the installer is not required to select the proper lubricant since the coating is already in place prior to the manufacturing operation. The coating 10 improves the shelf life of the gasket. Oxidation resistance is improved so that SBR type materials are offered added protection when exposed to direct sunlight. In field applications, insertion forces arc reduced without altering the efficiency of the compression seal. Colored coatings can be used to mark the product type, thereby making the particular gasket type easy to recognize.

While the invention has been shown in only one of its forms, it is not thus limited but is susceptible to various changes and modifications without departing from the spirit thereof.

What is claimed is:

1. A method of installing a gasket in a socket end of a thermoplastic pipe which is used to form a pipe coupling, the method comprising the steps of:

providing a mandrel with an inner end and an outer end and having a generally cylindrical outer working surface;

installing a gasket at a first circumferential position on the outer working surface, the gasket having at least selected surfaces coated with a spray-on anti-friction coating wherein the spray-on anti-friction coating is applied by spraying on a dry powder followed by heating the powder to cause it to be fixed;

providing a retention member at a second circumferential location on the mandrel nearer the inner end of the mandrel, the retention member abutting the gasket in a normally extended position but being retractable to a retracted position in a subsequent manufacturing step;

heating a socket end of the thermoplastic pipe;

forcing the heated socket end of the thermoplastic pipe over the working surface of the mandrel and over the gasket with the retention member being in the extended position, whereby the heated socket end of the thermoplastic pipe flows over the gasket to form a retention groove for retaining the gasket and again contacts the working surface of the mandrel;

cooling the heated socket end of the thermoplastic pipe;

retracting the cooled socket end of the thermoplastic pipe and the retained gasket from the working surface of the mandrel.

2. The method of claim 1, wherein the retention member is a back up collar.

3. The method of claim 1, wherein the retention member is a series of spring loaded detents located on the mandrel.

4. The method of claim 1, wherein the retention means comprises a plurality of outwardly biased detents at the second circumferential location on the mandrel nearer the inner end of the mandrel, the outwardly biased detents having exposed lip portions which abut the gasket in a normally extended position, the detents being retractable to a retracted position flush with the outer working surface of the mandrel.

5. The method of claim 1, wherein the dry powder is a fluoropolymer powder.

6. The method of claim 5, wherein the dry powder is polytetrafluoroethylene.

7. The method of claim 1, wherein the gasket is an elastomeric, ring shaped member having a circumferential contact area and an exterior surface, and wherein the anti-friction coating is applied to at least selected portions of the circumferential contact area.

8. The method of claim 7, wherein the gasket is a ring shaped elastomeric body which, when viewed in cross section, includes a leading nose region and a lower compression region, the leading nose region being joined to the lower compression region by a leading curved surface region which defines an angle $\alpha$ with respect to a horizontal axis drawn parallel to a central axis of the pipe, the lower compression region being joined to a secondary seal surface by a trailing curved surface region which defines a second angle $\beta$ with respect to the horizontal axis drawn parallel to the central axis of the pipe, the anti-friction coating being applied to at least the leading nose region and lower compression region.

9. The method of claim 8, wherein the retracting step of retracting the cooled socket end of the thermoplastic pipe and the retained gasket from the working surface of the mandrel serves to force the detents to the retracted position to allow travel of the thermoplastic pipe over the working surface of the mandrel.

10. The method of claim 1, further comprising the steps of applying a vacuum to the heated, socket end of the thermoplastic pipe after the pipe has been forced over the working surface of the gasket and mandrel to thereby force the heated, socket end to contract about the mandrel and gasket.

11. The method of claim 10, wherein an angle $\alpha$ and an angle $\beta$ are selected to minimize the insertion force required when inserting the male spigot end within the female socket end while maintaining a compression seal between the pipe sections.

12. The method of claim 11, wherein the angle $\alpha$ is selected to be less than about 60 degrees and the angle $\beta$ is selected to be greater than about 45 degrees.

* * * * *